United States Patent
Thomson et al.

(10) Patent No.: US 11,725,678 B2
(45) Date of Patent: Aug. 15, 2023

(54) RAIL ELEMENT FOR A CAMERA SLIDER RAIL SYSTEM

(71) Applicant: SYRP LIMITED, Auckland (NZ)

(72) Inventors: Christopher Thomson, Auckland (NZ); Samuel Blok, Auckland (NZ); James Allen, Auckland (NZ)

(73) Assignee: SYRP LIMITED, Auckland (NZ)

( * ) Notice: Subject to any disclaimer, the term of this patent is extended or adjusted under 35 U.S.C. 154(b) by 392 days.

(21) Appl. No.: 16/977,600

(22) PCT Filed: Feb. 20, 2019

(86) PCT No.: PCT/IB2019/051350
§ 371 (c)(1),
(2) Date: Sep. 2, 2020

(87) PCT Pub. No.: WO2019/171193
PCT Pub. Date: Sep. 12, 2019

(65) Prior Publication Data
US 2020/0400170 A1     Dec. 24, 2020

(30) Foreign Application Priority Data

Mar. 5, 2018   (NZ) ........................................ 740431

(51) Int. Cl.
| G03B 17/56 | (2021.01) |
| F16B 2/04 | (2006.01) |
| F16B 7/04 | (2006.01) |
| F16M 11/42 | (2006.01) |

(52) U.S. Cl.
CPC .............. *F16B 2/04* (2013.01); *F16B 7/0413* (2013.01); *F16M 11/425* (2013.01); *G03B 17/561* (2013.01)

(58) Field of Classification Search
CPC ....... F16M 11/425; G03B 17/561; F16B 2/00; F16B 2/04; F16B 2/14; F16B 2/18; F16B 7/00; F16B 7/025; F16B 7/04; F16B 7/0406; F16B 7/0413; F16B 7/042
See application file for complete search history.

(56) References Cited

U.S. PATENT DOCUMENTS

| 2,214,177 | A | | 9/1940 | Raybould | |
| 2,308,542 | A | | 1/1943 | Raybould | |
| 4,756,639 | A | | 7/1988 | Hoshino | |
| 6,302,614 | B1 | * | 10/2001 | Tseng | ................... F16B 7/1463 |
| | | | | | 403/109.5 |
| 6,557,775 | B1 | * | 5/2003 | Brinson | .................. E01B 23/04 |
| | | | | | 238/148 |

FOREIGN PATENT DOCUMENTS

| DE | 19514752 A1 | 10/1996 | |
| DE | 202006005965 U1 * | 7/2006 | ................ B60S 9/04 |

* cited by examiner

*Primary Examiner* — Clayton E. LaBalle
*Assistant Examiner* — Fang-Chi Chang
(74) *Attorney, Agent, or Firm* — Volpe Koenig

(57) ABSTRACT

A rail element (10, 33) for a camera slider system or, more generally, a tube joiner for a rail comprised of an expansion device (23, 30), located internally at an open end (12, 32) of a tubular body (11, 33). The expansion device is configured to fit within a male part or joiner element (16, 31) that may be inserted into the end of the tube (10, 33) and can be actuated to an expanded state where it exerts force radially outwards through the joiner (16, 31) to hold it against the open end (12, 32), thereby joining two tubular or rail element ends together.

18 Claims, 5 Drawing Sheets

RAIL ELEMENT FOR A CAMERA SLIDER RAIL SYSTEM

FIELD OF INVENTION

The invention relates to a rail element for a camera slider rail system. Particularly the invention enables a rail system that is modular and extendable where multiple rail elements can be combined to form a total length of rail. The invention can also be more broadly applied as a tube joiner for many types of products, particularly camera-related products, e.g. camera cranes, tripods, light stands, cable cams and camera dollies.

BACKGROUND TO THE INVENTION

A common method of capturing motion with a film or video camera is to mount the camera on a carriage arranged for sliding movement along one or more, typically a pair of, rails. In order to ensure smooth movement and motion capture by the camera the carriage may incorporate a flywheel and, indeed, the surface of the rails contacting the carriage must also be correspondingly smooth.

It will be apparent that any joins between adjacent rail elements should be effectively seamless to ensure a smooth transition from one rail element to another or else the carriage travelling over the join may be subjected to a minor jitter/shake and ruin the fluidity of the shot.

Extendable track systems are known where lengths of rail may be joined, however, such systems typically require an external joining means to hold parts together.

SUMMARY OF THE INVENTION

It is an object of the present invention to provide a rail element, one or more of which are to be incorporated into a rail system for a camera slider, which overcomes or at least partially ameliorates some of the abovementioned disadvantages, e.g. enabling a smooth sliding surface to be achieved. At the least the rail system and a rail element according to the invention should provide the public with a useful choice.

In a broad aspect the invention provides a rail element for a camera slider system, comprising:
a longitudinal body portion;
a radially expandable joiner element, located at or proximate to at least one end of the longitudinal body portion.

The joiner element is preferably radially expandable by virtue of an expansion device or means actuated to exert radial force against internal walls of the joiner element. In a preferred embodiment the joiner element is receivable into an open end of the rail element and/or an open end of an adjacent rail element. It is also possible that the joiner element can be construed as the expansion device located within an open hollow end of a tube, to receive (or be received by) a joining extension from a tube to be joined. In one embodiment there may be a joiner integrated into one end of a tube, forming a male portion, with the joiner permanently mounted and a cooperating female end that houses the expansion mechanism. In an alternative embodiment the expansion device may be integrated into the male portion, for cooperation with a female end of an adjoining tube.

Preferably, where the joiner element is an insert, it is supplied with the rail element as part of a rail system for a camera slider. The joiner element may be a cylindrical length, e.g. with a split in a sidewall thereof to accommodate slight increases in diameter when the engagement/joiner means/mechanism is engaged, to expand and exert force onto the inner wall of the open end. Preferably, an external wall of the joiner element is corrugated and/or generally includes a plurality of longitudinal channels or features for improving secure engagement with the inner wall of the open end. Alternatively, the joiner element may be formed integrally with or otherwise extend from an end of an adjacent rail element or other component part, such as an end support. The end support may include foldable and/or extensible legs for supporting the rail element above a ground surface.

In alternate embodiments as mentioned the joiner element may be integral/fixed with and form the open end of the rail element. The expansion element/means may reside within the fixed joiner element to be received into an open end of an adjacent rail element. The substantive diameter of the respective rail elements would be the same while the joiner end is a slightly smaller diameter. Such a configuration may only require a single joiner mechanism per join.

In a preferred embodiment the expansion device or means is a mechanism comprising a lever, e.g. accessible at and/or through an outer wall of the body portion, that actuates a rod extending longitudinally within the longitudinal body portion. Preferably the rod includes a widened distal end such that, when the lever actuates the rod in a direction away from the open end it squeezes a resilient element against a static surface. The squeezed resilient element deforms, i.e. expands, radially outward to engage the joiner element and press it against the inner wall of the open end. The expansion means should be understood to be any device configuration which achieves the inventive concept, which is to provide an internally expandable member configured to exert radial force for the purposes of securing one element against another. The solution could be by mechanical, hydraulic or other means that achieves expansion of an internal member against a surrounding element.

Preferably, the lever actuation on the rod also draws the joiner element into the open end of the body. In this way if two rail elements abut, each with open ends facing each other to engage a joiner element by way of a respective joiner mechanism, the open ends are drawn together to form a minimal seam/joint.

The tube joining mechanism of the invention enables two tubes/rails to be connected internally such that at least a substantive portion of the external structure, for engagement with a camera slider or the like, is smooth across the join; there being no bumps or external features that could ruin a motion picture shot.

As used herein the term "and/or" means "and" or "or", or both.

As used herein "(s)" following a noun means the plural and/or singular forms of the noun.

The term "comprising" as used in this specification and claims means "consisting at least in part of". When interpreting statements in this specification and claims which include that term, the features, prefaced by that term in each statement, all need to be present but other features can also be present. Related terms such as "comprise" and "comprised" are to be interpreted in the same manner.

The entire disclosures of all applications, patents and publications, cited above and below, if any, are hereby incorporated by reference. For the purposes of this specification, the term "plastic" shall be construed to mean a general term for a wide range of synthetic or semisynthetic polymerization products, and generally consisting of a hydrocarbon-based polymer. For the purpose of this specification, where method steps are described in sequence, the sequence does not necessarily mean that the steps are to be chronologically ordered in that sequence, unless there is no other logical manner of interpreting the sequence.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth. For example, the terms 'rail', 'slider' etc. may have alternative expressions but refer to functionally equivalent components. For the purposes of interpretation all functionally equivalent expressions are deemed disclosed.

BRIEF DESCRIPTION OF THE DRAWINGS

Aspects of the invention will become apparent from the following description which is given by way of example only and with reference to the accompanying drawings, wherein.

DETAILED DESCRIPTION OF THE INVENTION

Figure 1:
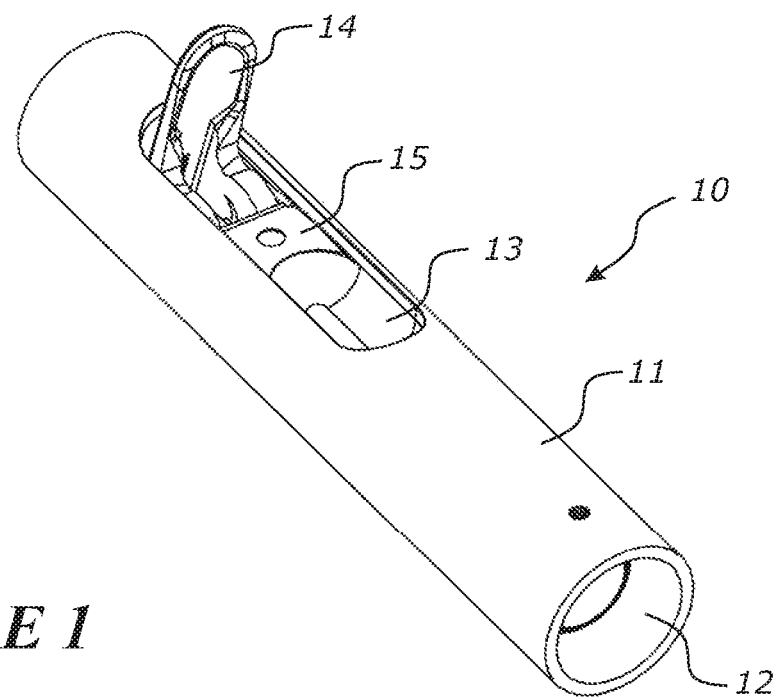
FIG. 1 illustrates a general overview of a rail element according to an embodiment of the invention.

FIG. 1 shows a rail element 10 of generally cylindrical appearance. The external cylindrical wall forms a longitudinal body portion 11 that will be substantially smooth over the extent which is to contact wheels or other elements of a cameral slider (see FIG. 6).

The longitudinal body 11 includes an open end 12 exhibiting that the rail element is generally of a hollow tubular construction. A side opening 13 provides internal access to the body portion 11 and, particularly, access to a lever 14, shown (in FIG. 1) in an upstanding state prior to engagement with another rail element 10. Also visible through opening 13 is a lever mount block 15 which generally supports the lever and defines its freedom of movement.

Figure 2:
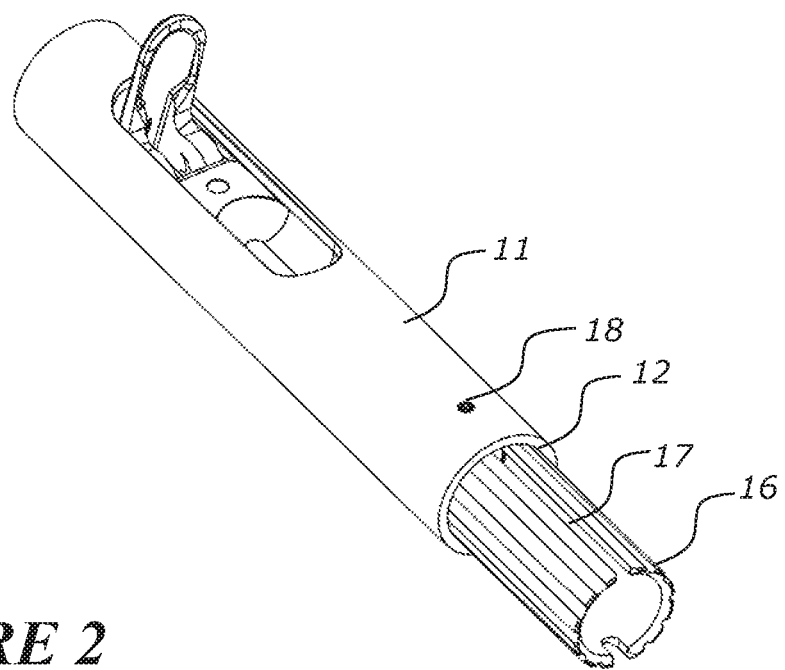
FIG. 2 illustrates the general view of FIG. 1, wherein a joiner element has been inserted into an open end of the rail element.

FIG. 2 illustrates the same perspective/state view as FIG. 1 with a joiner element 16 in place, in the form of a tubular insert with a split 17 extending longitudinally along its entire length. Joiner element 16 is insertable into open end 12 of the body portion 11 and pushed in far enough to engage the joiner mechanism located internally within the rail element. Details of the engagement/joiner means are provided herein with reference to FIGS. 4 and 5.

In the illustrated embodiment a pin 18 extends through the cylindrical wall of body portion 11 to protrude internally. Pin 18 limits any compression closure of joiner element 16 by virtue of split/slot 17 and also enables alignment by centring the joiner element concentric with the tubular wall of rail element 10. It will also be apparent that pin 18 prevents twisting of joiner element 16 to improve coupling. Pin 18 may be omitted in alternative embodiments.

In addition to side split 17, joiner element 16 also includes a corrugated surface, generally having a plurality of raised features that will engage and grip against an inner wall of the tubular body portion 11. The corrugation allows the joiner to flex, as if using a softer material. A corrugation or other surface features incorporated with the joiner may be omitted in alternative embodiments.

Joiner element 16 maybe made from aluminium or plastic so as to have a relative softness compared to the rail body portion (typically constructed of a harder metal, composite and/or polymer material such as titanium, carbon fibre, aluminium and/or fibre-reinforced plastic).

FIGS. 1 and 2 generally show a female tube in an open state ready to receive a male tube, or a joiner component, allowing two female tube ends to join.

Figure 3:
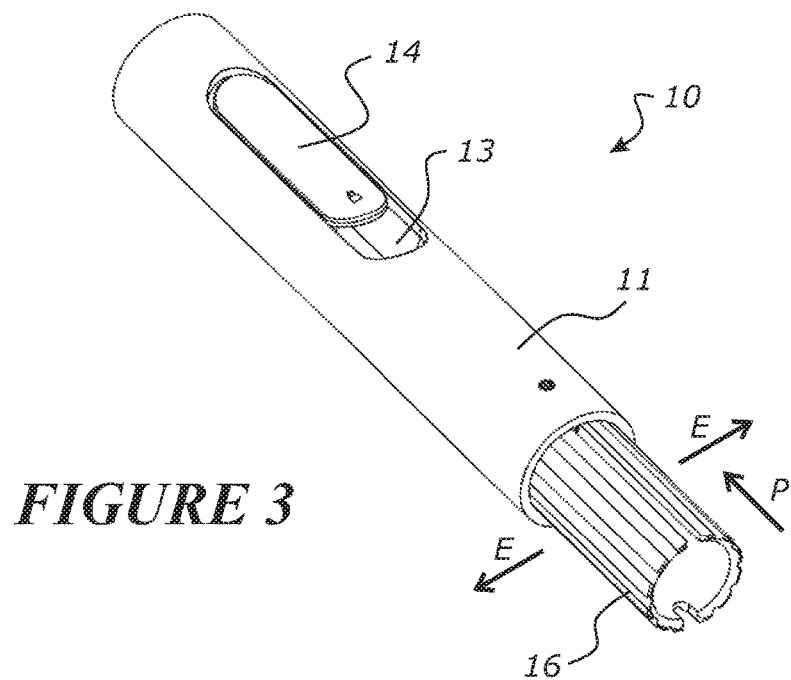
FIG. 3 illustrates an overview of the rail element in a second state where a joining mechanism has been engaged.

FIG. 3 illustrates a second, engaged, state of the joining/engaging mechanism where lever 14 has been flipped into body portion 11 to substantially cover opening 13, leaving only enough space for engagement by a user's finger in order to return lever 14 to an upright position. Directional arrows E and P represent internal expansion of the joiner element 16 and a pull force respectively, as occurs within open end 12. With the lock lever closed the mechanism expands the joiner and pulls it inwards to ensure a tight fit.

Figure 4:
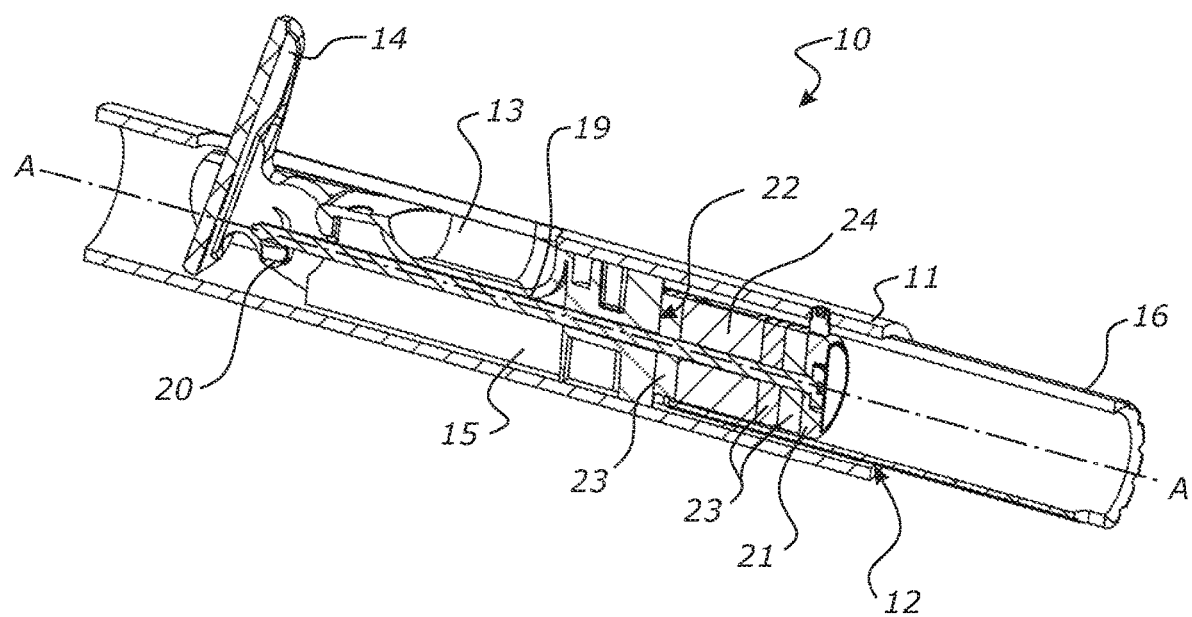
FIG. 4 illustrates a cross-section side of the rail element in the state shown by FIG. 2, wherein a rod is actuatable by a lever and moveable longitudinally within the rail element.

FIG. 4 illustrates a cross section view where lever 14 and the joiner means or 'internal engagement mechanism' is visible in an unengaged state, consistent with FIG. 1. Here a rod 19 extends from an anchor point proximate but offset from the pivot axis 20 of lever 14 to a distal end that includes a widened head portion 21.

Rod 19 extends through lever mount block 15 and is arranged for sliding movement along the longitudinal axis A of the rail element 10.

Block 15 is formed of a substantially rigid/non-resilient material which securely mounts lever 14 and provides a restricted coaxial path of movement for rod 19 therethrough. An end face 22 of block 15 provides a wall that defines a cavity formed by open end 12 of the tubular body portion 11. Wall 22 is static such that at least one resilient element 23 threaded onto rod 19 is able to be pressed and deformed against its surface.

In the illustrated form three resilient elements 23 are threaded upon rod 19, separated by a non-resilient cylindrical block 24 which provides a further hard surface against which resilient elements 23 can deform.

Figure 5:
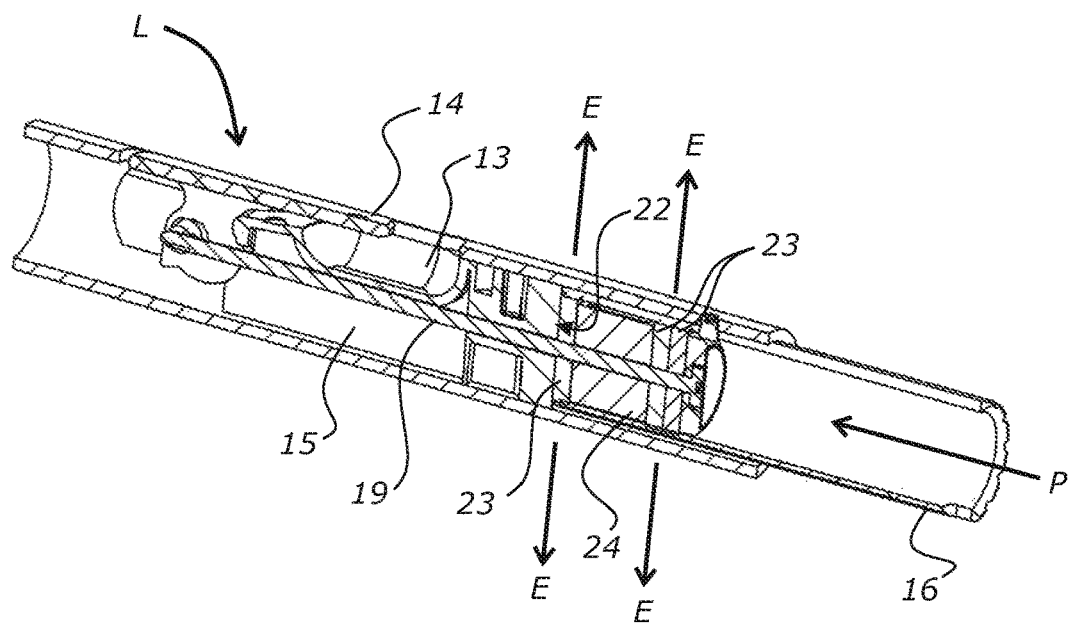
FIG. 5 illustrates a cross-section side of the rail element in the state shown by FIG. 3, wherein the rod has moved longitudinally within the rail element away from an open end, thereby causing deformation of a series of resilient elements and exerting force radially against the joiner element and internal walls of the open end of the rail element.

As shown by the engaged state of FIG. 5 (consistent with FIG. 3) the leveraged directional motion L of lever 14 will cause rod 19 to withdraw into body portion 11 in a direction of arrow P, causing widened head 21 to press/squeeze resilient elements 23 against the hard wall surface 22 and the hard outer surfaces of cylindrical block 24, thereby deforming and exerting outward engagement pressure onto the internal walls of joiner element 16. The radial exertion force E secures joiner element 16 while the movement in the direction P helps to pull joiner element 16 further into open end 12.

Particularly, when a like joining mechanism (e.g. lever 14, block 15 and rod 19) is implemented in an adjacent rail element receiving the exposed end of joiner element 16, the outer rims of open end 12 of adjacent rail elements are abutted and pulled towards one another, thereby minimising any gap/seam between rail elements 10. In other words, another female tube is attached to the joiner in the same way from the opposite end.

It will be apparent that two of the resilient elements 23 are grouped close to the rod head 21 and a third resilient element 23 is located against the end face 22 of block 15. The resilient elements 23 are spaced apart (e.g. by block 24) so as to improve the overall capture of joiner insert 16 and the bending moment reaction to external forces subjected to the assembled rail. Furthermore, block 24 is sized to fit snugly within joiner 16 along with the resilient elements 23 so that any bending proximate the join is minimised by the solid body packed into the tubular cavity. An alternative configuration may feature an elongate expansion device, that packs a substantive extent of the tubular cavity into which it is inserted.

Figure 6:
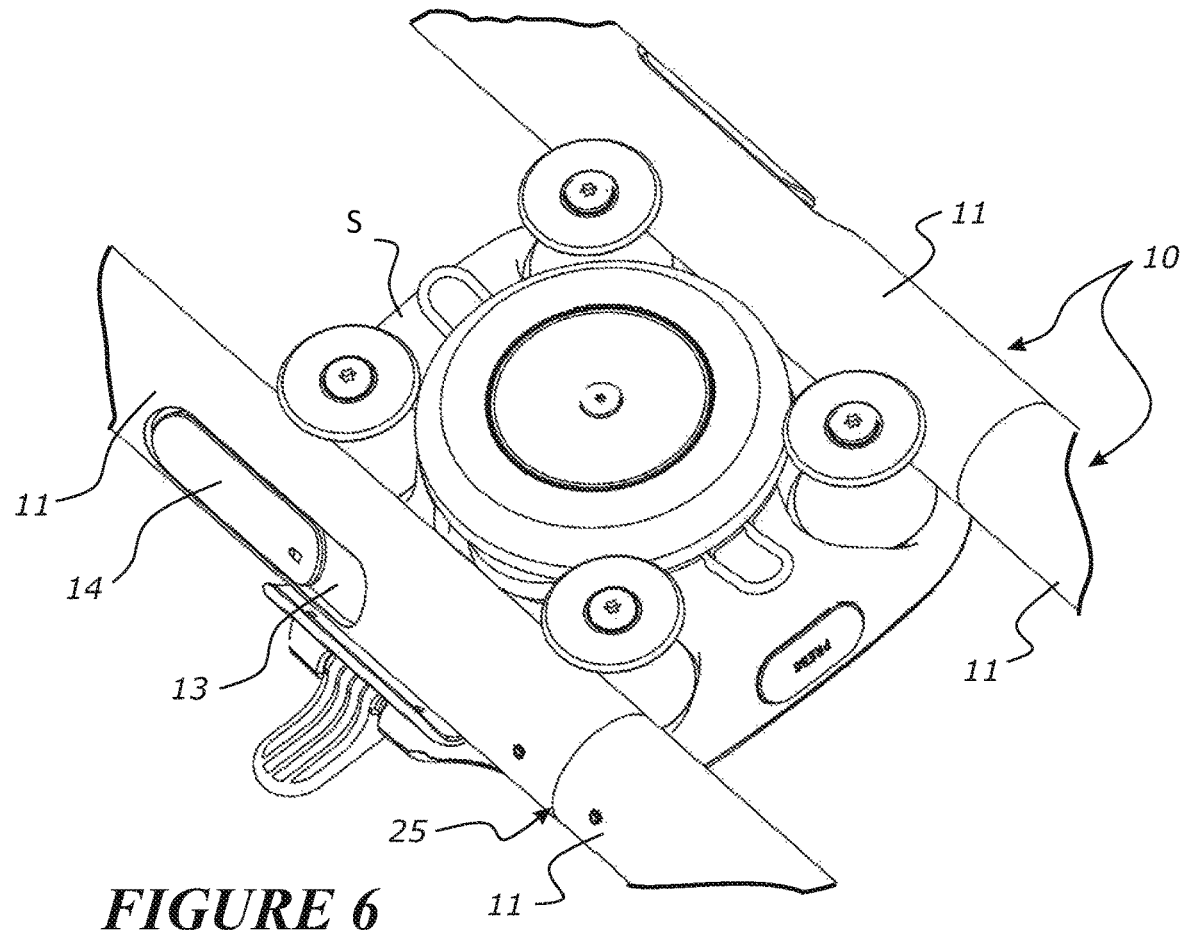
FIG. 6 illustrates a general underside view of a camera slider, mounted with a rail system according to the invention.

FIG. 6 shows an underneath view of a camera slider unit S mounted for sliding movement between parallel rails 10 where it will be apparent that the lever 14 and exposed opening 13 are oriented away from the contact area between rails 10 and slider S. A join 25 is visible between abutting open ends 12 of adjacent rail elements 10 but, by virtue of the invention, should have no adverse effect on a slider S moving thereover.

A contoured rubber strip (not shown) may be optionally adhered to the contact area of rail element 10 with respect to slider carriage S to improve grip and drive of the slider S.

Figure 7:
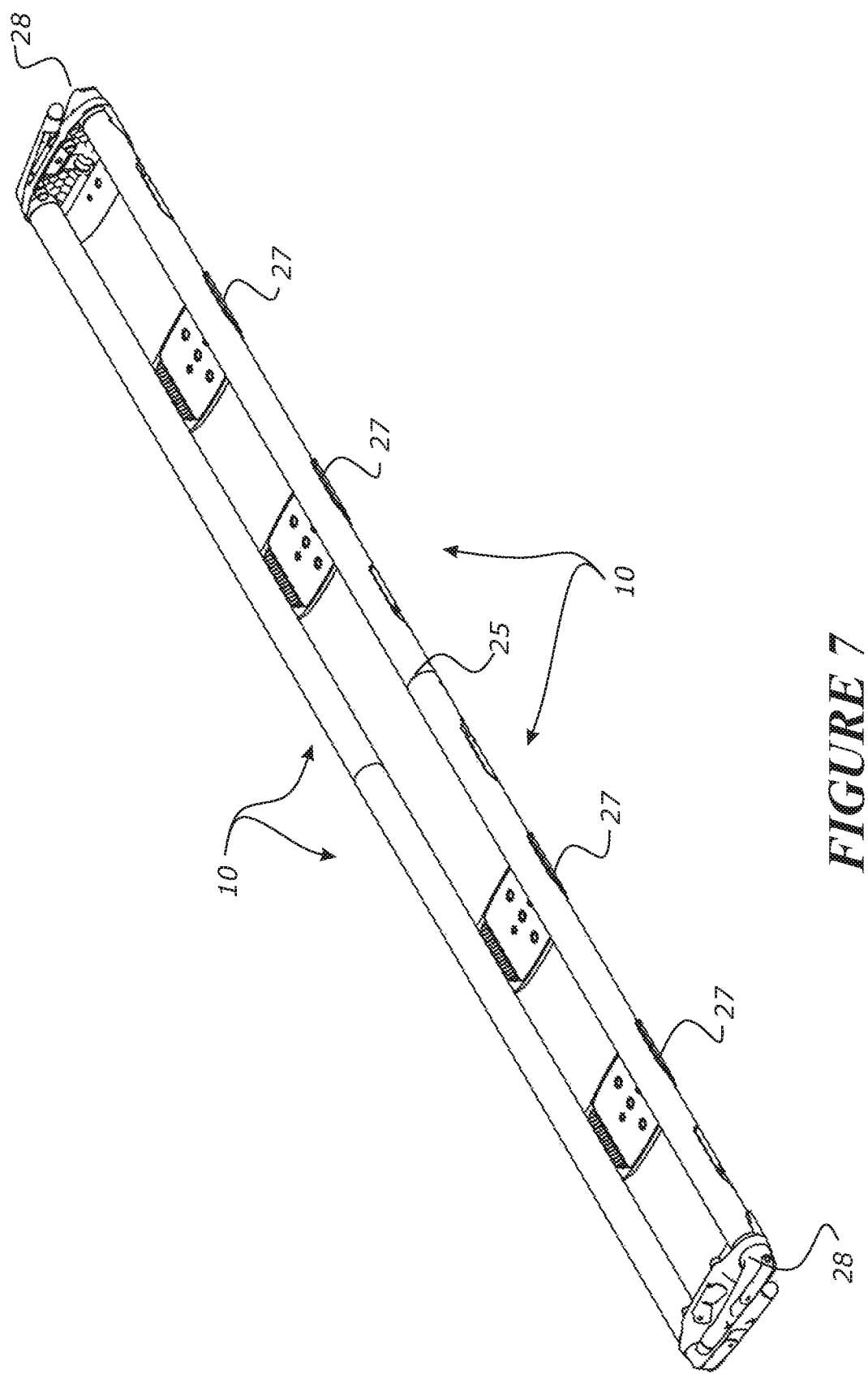
FIG. 7 illustrates an assembled view of a rail system comprised of a plurality of rail elements.

FIG. 7 illustrates an overview of an assembled rail system comprised of at least four rail elements 10, arranged as a double length of parallel pairs, yet any number of pairs could be joined to make a required length. An intermediate support element 27 is provided to span the distance between parallel rails 10 and improve rigidity/overall stability of the assembled rail system structure. Furthermore, end support elements 28 may cover the terminal end of rail elements 10 and provide extendible legs/feet for locating the system on a ground surface. Preferably each end element 28 will include an extending joiner element section equivalent to illustrated element 16, able to be received by an open end 12 of a rail element 10.

It is noteworthy that the illustrated form of rail element from FIGS. 2 and 3 also resembles an alternative embodiment of the invention where the joiner element 16 may be formed integrally or otherwise fixed to body 11. In such an embodiment the joiner means/mechanism (shown in FIGS. 4 and 5) would be located further into the distal end of joiner element 16 such that, when an open tubular end of a second rail element receives joiner element 16, the joiner means is expandable to exert radial force internally of joiner 16 and press it against the open tubular end.

Where in the foregoing description reference has been made to elements or integers having known equivalents, then such equivalents are included as if they were individually set forth. Although the invention has been described by way of example and with reference to particular embodiments, it is to be understood that modifications and/or improvements may be made without departing from the scope of the invention.

The invention has been described with reference to a rail element in a camera slider system, however, it will be apparent that the joining mechanism may be more widely applicable to the joining of tubular members in any field either related to camera equipment or not. For example, FIG. 8 illustrates an alternative embodiment of tube joiner device possessing a common inventive concept with the joiner system of FIGS. 1 to 7.

A radial expansion device is generally encircled by a dotted line box 30. The mechanism of operation of the illustrated expansion device is the same as described previously, i.e. actuation of a rod 19 in a direction P that squeezes resilient members 23 against harder surfaces 22 and 24 in order to radially expand against a joiner element 31. However, alternative means of expanding outwardly to engage a surface will be possible.

Figure 8:
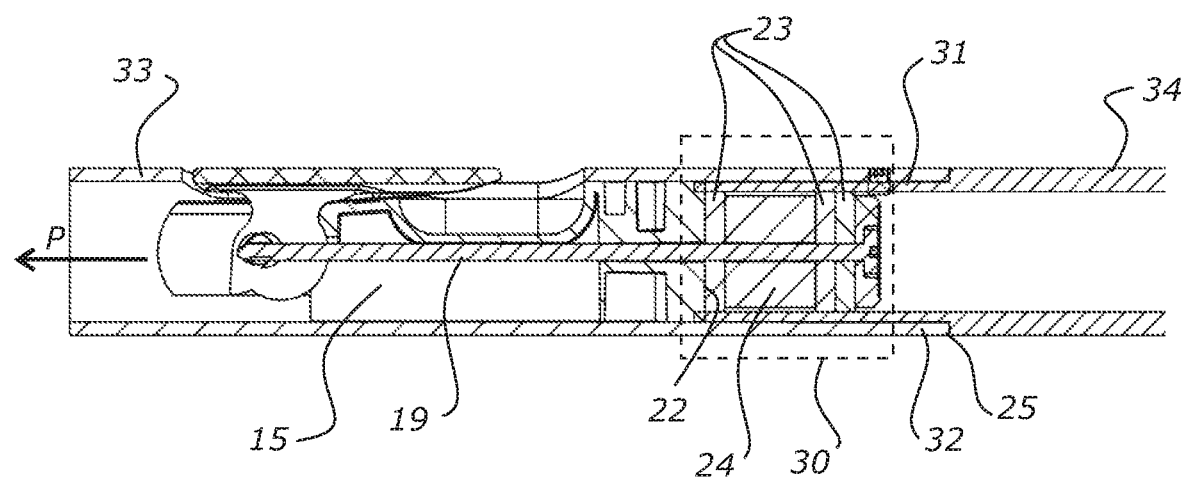
FIG. 8 illustrates a cross-section side view of an alternative embodiment of tube joiner.

In the embodiment of FIG. 8 a female tubular part or sleeve end 32, associated with a first tube 33 which internally houses the expansion device 30, receives a male tubular joiner part 31 associated with an adjoining second tube 34. As shown, male tubular part 31 extends into sleeve end 32 while surrounding the resilient members 23 and other distal components of expansion device 30. Therefore, when activated, expansion device 30 expands radially to press against the internal walls of male part 31 that, in turn, presses against the female sleeve end 32. As described previously, the movement in direction P also serves to pull male part 32 deeper into position and minimise any seam 25 visible externally and ensure a smooth surface transition.

Male joiner element 31 may have a longitudinal sidewall split to accommodate expansion or be formed of suitable materials as necessary.

An alternative form of FIG. 8 may feature the male and female parts of tubes 33 and 34 respectively in a reversed configuration. That is to say, male joiner element 31 may extend integrally from first tube 33 which houses expansion device 30 to be received by a wider female open end 32 of second adjoining tube 34. Such an embodiment would operate in the same way, but could not serve to provide the beneficial force to pull the tubes together (although, nor would it push them apart since male part 31 would be static while rod 19 reciprocates therewithin).

The invention claimed is:

1. A rail element for a camera slider system, the rail element comprising:
    a longitudinal body portion;
    an expandable joiner element, located at or proximate to at least one end of the longitudinal body portion wherein the expandable joiner element comprises an expansion device, housed within the body portion, configured to exert force outwardly, wherein the expansion device comprises a lever configured to actuate a rod extending longitudinally within the longitudinal body portion.

2. The rail element of claim 1, wherein the at least one end is an open tubular end for receiving the joiner element which extends therefrom for being received by an adjacent open tubular end of another rail element.

3. The rail element of claim 1, wherein the joiner element extends from the at least one end for being received by an adjacent open tubular end of another rail element.

4. The rail element of claim 1, wherein the joiner element is a cylindrical length or insert.

5. The rail element of claim 1, wherein the joiner element comprises a split in a sidewall thereof.

6. The rail element of claim 5, including a pin or lug protruding internally from the longitudinal body portion, to be accommodated by the split of the joiner element.

7. The rail element of claim 1, wherein an external wall of the joiner element is corrugated and/or generally includes a plurality of longitudinal channels or features.

8. The rail element of claim 1, wherein the rod extends through at least one resilient element and includes a widened head at a terminal end thereof.

9. The rail element of claim 8, wherein the lever is mounted from a block element, housed within the body portion, with a bore therethrough housing the rod.

10. The rail element of claim 9, wherein the lever is configured to cause the rod to move in a direction away from the at least one end of the longitudinal body portion, thereby compressing the resilient element between the widened head and a wall of the block element, causing radial expansion against the joiner element.

11. The rail element of claim 8, wherein there are at least two resilient elements, spaced apart by a non-resilient element.

12. The rail element of claim 11, wherein the non-resilient element has a diameter approximately the same as the resilient elements or at least slightly less than any tubular member into which the non-resilient element is to be inserted.

13. The rail element of claim 1, wherein the lever is accessible at, through or both at and through an outer wall of the body portion.

14. The rail element of claim 13, wherein the lever is configured to travel between an upstanding position, where the expansion device is in an inactivated state, to a position substantially flush with the outer wall of the body portion, where the expansion device is in an activated state.

15. The rail element of claim 1, wherein the expansion device is configured to exert an axial force as well as the outwardly exerted force.

16. The rail element of claim 15, wherein the axial force is a pull force for pulling two adjacent rail elements together.

17. A rail system for a camera slider, incorporating at least one rail element according to claim 1.

18. A tube joiner for joining ends of two tubes, the tube joiner being comprised of:

an expansion device to be housed internally and proximate to an end of at least one of the tubes, the expansion device having a first, unexpanded, state configured to fit within a male part extending between the two tubes to be joined, and a second, expanded, state when the expansion device is configured to exert force internally against the male part to hold the expansion device against a female part that receives the male part, wherein the expansion device includes a rod and a lever for actuating the rod which extends longitudinally within the tube.

* * * * *